W. V. TURNER.
FLUID PRESSURE BRAKE DEVICE.
APPLICATION FILED APR. 2, 1917.
1,281,434. Patented Oct. 15, 1918.
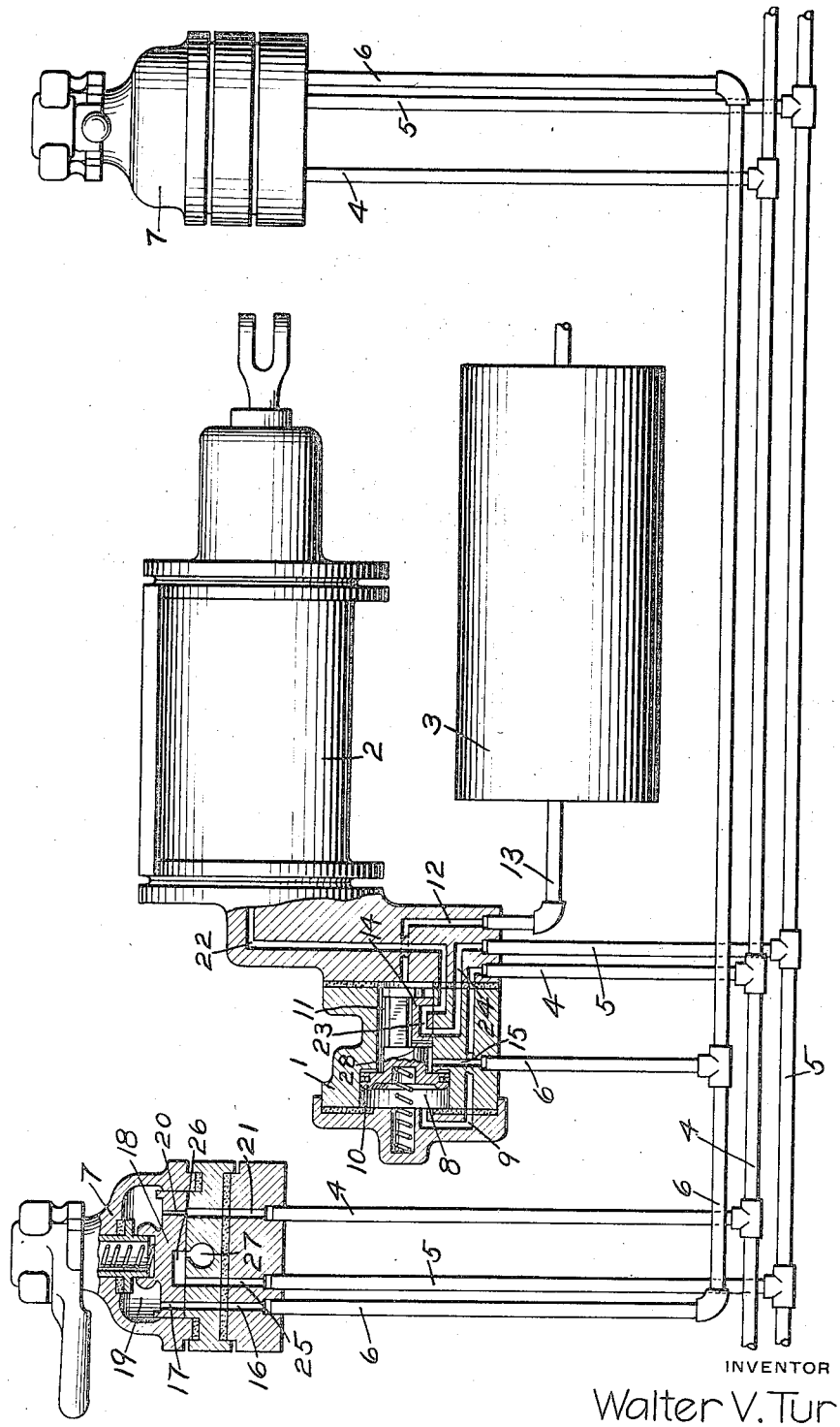
INVENTOR
Walter V. Turner
by Wm. M. Cady
Atty.

UNITED STATES PATENT OFFICE.

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

1,281,434.  Specification of Letters Patent.  Patented Oct. 15, 1918.

Application filed April 2, 1917. Serial No. 159,062.

*To all whom it may concern:*

Be it known that I, WALTER V. TURNER, a citizen of the United States, residing at Wilkinsburg, in the county of Allegheny and State of Pennsylvania, have invented new and useful Improvements in Fluid-Pressure Brake Devices, of which the following is a specification.

This invention relates to fluid pressure brakes, and more particularly to the type of equipment known as the straight-air emergency equipment.

In the straight-air-emergency equipment there is provided an emergency valve device adapted to supply air to the brake cylinder upon a sudden reduction in brake pipe pressure and adapted to control communication through which the brakes can be normally applied and released by straight air upon manipulation of the brake valve.

With the above equipment, fluid under pressure may be supplied to the emergency valve device and to the brake valve from the main reservoir, and if the main reservoir supply pipe should break, it will be evident that no brake could be obtained, since fluid in the reservoir would escape to the atmosphere.

The principal object of my invention is to provide a straight-air-emergency brake equipment in which an application of the brakes can be obtained, even in the event that the supply pipe for the brake valve should break.

In the accompanying drawing, the single figure is a diagrammatic view, partly in section, of a straight-air-emergency brake equipment embodying my invention.

The equipment may comprise an emergency valve device 1, a brake cylinder 2, a main reservoir 3, a brake pipe 4, a straight air application and release pipe 5, a main reservoir supply pipe 6, and a brake valve 7, preferably at each end of the car.

The emergency valve device 1 may comprise a casing having a piston chamber 8, connected by passage 9 with the brake pipe 4 and containing a piston 10 and having a valve chamber 11 connected by passage 12 and pipe 13 to main reservoir 3 and containing a slide valve 14.

According to my invention, instead of connecting the main reservoir to the brake valve by a direct pipe, the main reservoir supply pipe 6 is connected to a passage 15, leading to the seat of slide valve 14, and normally open to valve chamber 11.

In operation, the main reservoir 3 being charged with fluid under pressure in the usual manner, fluid flows therefrom through pipe 13 and passage 12 to valve chamber 11 and thence through passage 15 to the main reservoir supply pipe 6.

The brake valve 7 being in release position, as shown, fluid is supplied from pipe 6 through passage 16 and port 17 in the rotary valve 18 to rotary valve chamber 19, and thence through port 20 to passage 21 and the brake pipe 4, so as to normally maintain the pressure in the brake pipe at standard.

In the normal release position of the emergency valve device 1, the slide valve 14 connects passage 22 leading to the brake cylinder 2 through a cavity 23 with passage 24 leading to straight air pipe 5 and since the straight air pipe 5 is connected by passage 25, through cavity 26 in the rotary valve of the brake valve, with exhaust port 27, the brake cylinder will now be open to the exhaust. If it is desired to effect a straight air application of the brakes, the brake valve 7 is turned to straight air application position, in which fluid is supplied from the rotary valve chamber 19 to the straight air pipe 5 and thence to the brake cylinder 2, and the brakes may be released by turning the brake valve handle back to release position, as will be evident.

If the pressure in the brake pipe 4 is reduced by moving the brake valve to emergency position or by breakage of said pipe, the piston 10 of the emergency valve device will be shifted to emergency position and the slide valve 14 is operated to open passage 22 to valve chamber 11 so that fluid from the main reservoir 3 is supplied directly to the brake cylinder 2 to effect an emergency application of the brakes.

It will now be noted that breakage of the main reservoir supply pipe 6 will not prevent an application of the brakes, since the movement of the slide valve 14 closes the passage 15 which leads to the pipe 14 and at the same time fluid is supplied from the main reservoir to the brake cylinder.

While there is a pipe 13 connecting the main reservoir 3 with the emergency valve device 1, this pipe is short and is not liable to breakage. By this construction, ample capacity can be provided for supplying fluid to the brake cylinder in straight air applications without interfering with the desired operation of the emergency valve device.

After the emergency piston has been shifted to emergency position, the main reservoir being cut off from the main reservoir pipe 6, fluid will not be supplied to the rotary valve chamber 19 of the brake valve and consequently the brake pipe cannot be recharged to release the brakes. In order to overcome this difficulty, a restricted port 28 may be provided in the slide valve 14, which is adapted in emergency position to register with passage 15, so that fluid will be supplied from the main reservoir to the rotary valve chamber at a sufficient rate so that when the brake valve is turned to release position, fluid can be supplied from the rotary valve chamber to the emergency brake pipe.

Having now described my invention, what I claim as new and desire to secure by Letters Patent, is:

1. In a fluid pressure brake, the combination with a brake valve device, a fluid supply pipe leading to the brake valve device, and a source of fluid under pressure, of a brake pipe and an emergency valve device operated upon a reduction in brake pipe pressure for effecting an application of the brakes and adapted to control the supply of fluid from said source to the supply pipe.

2. In a fluid pressure brake, the combination with a brake valve device, a fluid supply pipe leading to the brake valve device, and a source of fluid under pressure, of a brake pipe and an emergency valve device operated upon a reduction in brake pipe pressure for effecting an application of the brakes and for cutting off the supply of fluid from the source of fluid under pressure to said supply pipe.

3. In a fluid pressure brake, the combination with a brake pipe, a supply pipe, and a brake valve device for supplying fluid from said supply pipe to the brake pipe, of a source of fluid under pressure and an emergency valve device operated upon a reduction in brake pipe pressure for effecting an application of the brakes and for cutting off or restricting the supply of fluid from said source to said supply pipe.

4. In a fluid pressure brake, the combination with a brake pipe, a supply pipe, a straight air pipe, and a brake valve device for controlling the supply of fluid from said supply pipe to the brake pipe and to the straight air pipe, of a source of fluid under pressure and an emergency valve device controlled by brake pipe pressure for effecting an application of the brakes and adapted to control the supply of fluid from said source to the supply pipe.

5. In a fluid pressure brake, the combination with a brake pipe, a supply pipe, a straight air pipe, and a brake valve device for controlling the supply of fluid from said supply pipe to the brake pipe and to the straight air pipe, of a brake cylinder, a source of fluid under pressure, and an emergency valve device normally connecting said source of fluid under pressure to the supply pipe and operated upon a reduction in brake pipe pressure for supplying fluid from said source to the brake cylinder and for cutting off the supply of fluid from said source to the supply pipe.

6. In a fluid pressure brake, the combination with a source of fluid under pressure and a supply pipe, of a valve device for effecting an emergency application of the brakes and having a restricted port for supplying fluid in emergency position from said source of fluid to the supply pipe.

7. In a fluid pressure brake, the combination with a source of fluid under pressure, a brake pipe, a supply pipe, and a valve device operated upon a sudden reduction in brake pipe pressure for effecting an emergency application of the brakes and for supplying fluid through a restricted port from said source to the supply pipe, of a brake valve having a position for supplying fluid from said supply pipe to the brake pipe.

In testimony whereof I hereunto set my hand.

WALTER V. TURNER.